Nov. 23, 1965 J. A. MARTIN 3,219,844

PULSE GENERATING CONTROL SYSTEM INCLUDING TRANSISTOR AND REGENERATIVE FEEDBACK

Filed Nov. 1, 1962 2 Sheets-Sheet 1

INVENTOR
Joseph A. Martin

BY Stewart F. Moore
ATTORNEY

Nov. 23, 1965 J. A. MARTIN 3,219,844

PULSE GENERATING CONTROL SYSTEM INCLUDING TRANSISTOR AND REGENERATIVE FEEDBACK

Filed Nov. 1, 1962 2 Sheets-Sheet 2

INVENTOR
Joseph A. Martin

BY Stewart F. Moore
ATTORNEY

United States Patent Office 3,219,844

Patented Nov. 23, 1965

3,219,844

PULSE GENERATING CONTROL SYSTEM INCLUDING TRANSISTOR AND REGENERATIVE FEEDBACK

Joseph A. Martin, Dayton, Ohio, assignor to American Machine & Foundry Company, a corporation of New Jersey Filed Nov. 1, 1962, Ser. No. 234,733
12 Claims. (Cl. 307—88.5)

Figure 1:
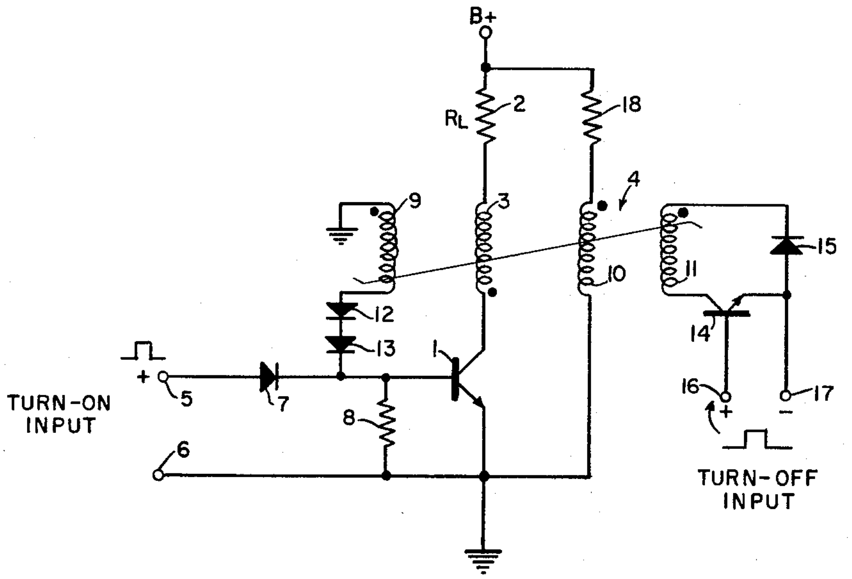

This invention relates to pulse generating or switching circuits, and while not limited thereto, relates particularly to such circuits utilizing low gain power transistors.

In designing electronic transistor control systems, it has often been found advisable to design such systems wherein the transistors operate in their switching mode, particularly where the apparatus experiences wide variations in surrounding ambient temperature and load conditions. When operating in the switching mode, there are only two conductive states of the transistor which are important, namely, cut off where the transistor is fully nonconductive, and saturation where the transistor is fully conductive. When a certain amount of base driving current is applied to a transistor the transistor is driven into the fully conductive saturated state, and thereafter further increases in the base driving current have no effect. The amount of base drive current required to produce saturation varies considerably in accordance with the surrounding ambient temperature conditions and current requirements of the load. Since most transistors have appreciable gain characteristics, as indicated by relatively high beta values, it becomes feasible to operate these transistors in such manner as always supply a base drive current sufficient to achieve saturation under the most demanding temperature and load conditions contemplated. In most cases, this selected base drive current would be in excess of the minimum required value for achieving saturation, but this is no problem since the base control current would still be negligible compared to the quantity of current controlled by the transistor. Thus, reliable switching mode operation can easily be achieved since the absence of base drive current causes the transistor to cut off, and the presence of the selected base drive current always drives the transistor into saturation regardless of ambient temperature and load conditions.

The foregoing design techniques, unfortunately, are not applicable when using low gain power transistors. Take, for example, the situation where it is desirable to utilize a low gain transistor in a switching circuit, or pulse generating circuit, where the load normally requires 5 amp. current but may occasionally require 30 amp. current. The base current required to achieve saturation with a 5 amp. load may be on the order of 1 amp., whereas the base drive current required for the 30 amp. load situation would be on the order of 6 amp. Thus, the technique of overdriving the base to take care of the worst conditions contemplated is useless in this case, since it would be necessary to control a base current of the same order of magnitude as is normally controlled with respect to the load. The problem is further complicated by variations in surrounding ambient temperature. The conventional technique for dealing with temperature changes is to insert a stabilizing resistance in the base circuit of the transistor. With low gain transistors, the currents in the base circuit must be appreciable, and therefore the power loss resulting from the use of a base circuit stabilizing resistor would be more than can be tolerated.

Thus, an object of this invention is to provide a switching or pulse generating circuit which can reliably operate low gain transistors in an efficient switching mode regardless of surrounding ambient temperature and variable load conditions.

Another object is to provide a circuit for reliably driving a transistor into a saturated state of conduction, for maintaining the transistor in the saturated state for a desired period of time, and for reliably terminating conduction in the transistor when desired.

Still another object is to provide a circuit for reliably switching a power transistor from saturation to cut off by means of a switching transistor.

It is yet another object to provide a switching circuit which can be operated in push-pull to provide appreciable current pulses of an accurately controlled time duration. It is a further object to provide such a push-pull circuit capable of providing pulses with accurately controlled time duration regardless of surrounding ambient temperature and variable load conditions.

In accordance with this invention, circuits are illustrated wherein a power transistor, and particularly a low gain power transistor is utilized and is so connected that the base driving current supplied is of the minimum required value for maintaining the transistor in an efficient saturated state of conduction. This is accomplished by initiating conduction in the power transistor by means of a trigger circuit and by thereafter maintaining the power transistor in a saturated state of conduction by means of regenerative feedback through a feedback transformer. The transformer is so connected that the base drive current is always proportional to the current supplied to the load device, and the transformer turns ratio is so selected that the base drive current supplied to the transistor is of the minimum value required to maintain the saturated state of conduction. A low current switching circuit is used to selectively interrupt the regenerative feedback operation and terminate conduction in the power transistor so that the time duration of conduction in the power transistor can be accurately controlled independently of the feedback transformer saturating characteristics.

In several illustrated embodiments of this invention, regenerative feedback is selectively interrupted by short-circuiting a shorting winding on the feedback transformer. At least one semiconductor diode with a predetermined forward conducting threshold voltage is connected between the transformer feedback winding and the base of the power transistor. The effect of short-circuiting the shorting winding on the feedback transformer is to momentarily reduce the regenerative feedback and hence the potential drop generated across the feedback winding. When the voltage across the feedback winding drops to a value below the threshold voltage of the diode, the diode completely blocks the flow of feedback current and therefore effectively terminates conduction in the power transistor. In other embodiments of this invention, a switching transistor is connected in the feedback path to selectively open the feedback loop or to by-pass feedback currents around the power transistor. Also illustrated is a push-pull pulse generator circuit utilizing a pair of power transistors and additional windings on the feedback transformer operated in accordance with the foregoing principles.

A better understanding of the invention as related to the stated objects and other objects can be achieved by referring to the following specification and drawings, which form a part of this specification, and wherein:

FIGS. 1–4 are electrical schematic diagrams illustrating circuits in accordance with four related embodiments of this invention.

Referring first to FIG. 1, one embodiment of this invention is illustrated including an NPN type transistor 1 having a base element, a collector element and an emitter element. Transistor 1 may be of virtually any standard type, and is selected such as to provide a sufficient collector-emitter circuit current carrying capacity to supply the current requirements to an associtaed load device 2. Transistor 1 can be, for example, a type ZN–2109 low gain power transistor. The collector of transistor 1 is connected to a positive source of potential B+ via a main winding 3 of a feedback transformer 4 connected in series with a resistor 2 representing the impedance of a load device. The emitter of transistor 1 is connected to ground. Thus, when a positive potential is applied to the base of transistor 1, the transistor is rendered conductive and current flows from the positive source of potential B+ through load resistor 2 and main winding 3.

A trigger circuit for transistor 1 includes input terminals 5 and 6 which are adapted to receive positive "turn-on" input pulses at terminal 5 with respect to terminal 6 from a suitable pulsing source. Terminal 5 is connected to the base of transistor 1 via a semiconductor diode 7, this diode being poled in a direction to pass positive pulses applied to input terminal 5. A resistor 8 is connected between the base and emitter of transistor 1, and is selected to have a resistance value proper to provide the degree of bias necessary to prevent "thermal runaway." Thus, when a positive "turn-on" pulse is applied to terminals 5 and 6, the base of transistor 1 is made positive with respect to the emitter, and therefore conduction is initiated in transistor 1.

In addition to main winding 3, feedback transformer 4 also includes a feedback winding 9, a reset winding 10, and a shorting winding 11. These windings are wound on a common transformer core which may be constructed from laminated iron. The windings are wound about the core in a direction to provide the phase relationship as indicated by the dot convention as shown in FIG. 1. In accordance with this convention, if the current flow through main winding 3, for example, is in a direction such that the dot end of the main winding is negative with respect to the other end, a potential will be generated in each of the other transformer windings which is negative at the dot end.

The dot end of feedback winding 9 is connected to ground, the other end of this winding being connected to the base of transistor 1 via diodes 12 and 13. Diodes 12 and 13 are connected in series and are poled in the same direction with the anode of diode 12 connected to the ungrounded end of feedback winding 9 and the cathode of diode 13 connected to the base of transistor 1. The operating characteristics of semiconductor diodes is that they have a relatively high impedance to current flow in the reverse direction, i.e., from cathode to anode. These diodes also display a relatively high impedance in the forward direction if the potential applied does not exceed the forward conducting threshold voltage for the diode. If the voltage applied across the diode is sufficient to exceed the threshold voltage, the diode will conduct in the forward direction providing a relatively low impedance. It should be noted that diodes 12 and 13 are in series with one another, and are also in series with the base emitter diode 7 portion of transistor 1, the base emitter diode also having a similar forward threshold voltage characteristic. Accordingly, current can flow through this series diode path whenever the voltage across feedback winding 9 is of the proper polarity and of a sufficient potential to exceed the cumulative threshold voltages of the three series diodes.

Main winding 3, feedback winding 9 and diodes 12 and 13 form a regenerative feedback path for transistor 1. Thus, when a "turn-on" pulse is applied to terminals 5 and 6, transistor 1 is rendered partially conductive and therefore current flows through main winding 3 generating a potential drop across feedback winding 9. The "turn-on" pulse must be of a sufficient magnitude to cause generation of potential across feedback winding 9 which exceeds the cumulative threshold voltages of the three series diodes. Thus, when such a "turn-on" pulse is applied, feedback current will begin flowing through feedback winding 9 into the base of transistor 1, thereby rendering the transistor further conductive. The feedback current continues to increase rendering transistor 1 further conductive until the transistor reaches a conductive state of saturation. Under these circumstances, the current flow through the collector-emitter circuit of transistor 1 and main winding 3 is limited in accordance with the impedance value of load resistor 2. The turns ratio between main winding 3 and feedback winding 9 is so selected that the current supplied to the base of transistor 1 under these conditions is of the minimum value required to maintain the transistor in a state of saturation. It should be noted that, if the load decreases in impedance value, thus requiring a larger current flow through transistor 1, the resulting increase in current flow results in an increase in feedback current supplied to the base of transistor 1. Thus, the amount of feedback current provided when transistor 1 is in a state saturation is always proportional to the current flow through the transistor collector-emitter circuit and is thus always of a sufficient value to maintain this transistor in a state of saturation regardless of load impedance.

The collector-emitter circuit of an NPN type transistor 14 is connected across shorting winding 11. More specifically, the emitter of transistor 14 is connected to the dot end of shorting winding 11 via a semiconductor diode 15, the cathode of this diode being connected to the shorting winding. The collector of transistor 14 is connected to the other end of shorting winding 11. Terminals 16 and 17 are adapted to receive "turn-off" pulses which are positive at terminal 16 with respect to terminal 17 provided by a suitable pulsing source connected thereto. Terminal 16 is connected to the base of transistor 14 and terminal 17 is connected to the emitter thereof. When a "turn-off" pulse is applied, transistor 14 becomes conductive and effectively short-circuits shorting winding 11, the current flow in the short-circuit loop being limited only by the combined forward conducting impedance of transistor 14 and diode 15 in series therewith. Shorting winding 11 preferably has a large number of turns compared to main winding 3 so that the potential across the shorting winding is relatively high and the current flow through transistor 14, when conductive, is relatively low. This has the effect of minimizing the current handling capacity required in transistor 14. As will be pointed out hereinafter, the short-circuiting current flows for a comparatively short period of time, and, therefore, this current flow can exceed the steady state current capacity of transistor 14.

It is a well known phenomenon that the impedance seen by current flow through the primary of a transformer depends upon the impedance connected across the secondary winding. Thus, when transistor 14 is rendered conductive, the impedance of main winding 3 decreases thus decreasing the potential drop across main winding 3 and feedback winding 9. The circuit parameters are so selected that the potential drop across feedback winding 9 is reduced to a value below the combined forward conducting threshold voltages of diodes 12, 13 and the base emitter diode of transistor 1 under these circumstances. The combined forward threshold voltage can be effectively increased to any necessary value by adding additional diodes in series with diodes 12 and 13. Thus, the effect of these series connected diodes is to complete the interruption of feedback current. Also, diodes 12 and 13 become back biased when "turn-on" pulses are applied to thus prevent the feedback winding from loading these pulses.

The dot end of reset winding 10 is connected to the positive source of potential B+ through a resistor 18, the other end of this winding being connected to ground. It should be noted that the direct current flow through main winding 3 has a tendency to drive the transformer core into one of its saturated states, for convenience referred to as positive saturation. It is therefore necessary to utilize the circuit including reset winding 10 to drive the core toward the opposite state of saturation, for convenience referred to as negative saturation. Accordingly, whenever transistor 1 is not conductive, current flow through the reset winding returns the core to the state of negative saturation. Resistor 18 is of a sufficient value to limit current to a reasonable value after the transformer core has been driven into negative saturation. The core of transformer 4 should be of a sufficient size to prevent the core from ever reaching positive saturation during the time interval in which transistor 1 is conductive. If the transformer core does reach positive saturation, this will have the effect of terminating the regenerative feedback and would thus render the turnoff circuit including transistor 14 completely useless.

The operation of the circuit in FIG. 1 can briefly be summarized as follows. Initially, it can be assumed that the core of transformer 4 is in the negative state of saturation and that transistors 1 and 14 are nonconducting. When a "turn-on" pulse is applied to terminals 5 and 6, transistor 1 is triggered into a partially conductive state and current begins to flow from the positive source of potential through load resistor 2, main winding 3 and the collector-emitter circuit of transistor 1. This current flow establishes a potential drop across feedback winding 9 sufficient to overcome the forward conducting threshold voltages of diodes 12 and 13 and the base-emitter diode of transistor 1. Thus, regenerative feedback current is supplied to the base of transistor 1. This regenerative feedback current via feedback winding 9 eventually drives transistor 1 into the fully conductive saturated state. Under saturated operating conditions, the current flow through the collector-emitter circuit of transistor 1 is established in accordance with the load impedance, and the feedback current supplied via feedback winding 9 is of the minimum value required to maintain transistor 1 in the saturated conductive state.

At a selected time thereafter, the conduction in power transistor 1 may be terminated by momentarily rendering transistor 14 conductive by applying a "turn-off" pulse to terminals 16 and 17. When transistor 14 is conductive, it effectively short-circuits shorting winding 11, thereby reducing the potential across feedback winding 9 to a value below the forward conducting threshold voltage of series diodes 12 and 13, and the base-emitter diode 7 of transistor 1. Accordingly, the feedback current abruptly ceases and transistor 1 becomes fully nonconductive or "cut off." Thereafter, current flow through reset winding 10 returns the transformer core to the negative state of saturation in preparation for the next pulse generating cycle. After a time interval sufficient to permit the transformer core to be completely reset to its initial condition, the pulse generating cycle can be repeated in like fashion.

Figure 2:
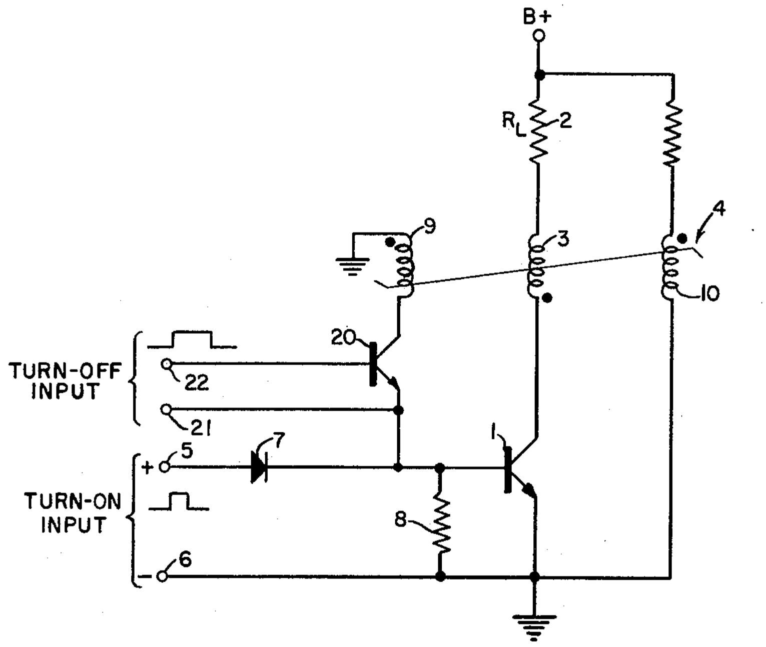

Another embodiment of the invention is illustrated in FIG. 2, wherein many of the circuit components are essentially the same as those previously described in FIG. 1, and therefore like reference numerals are utilized. The essential difference in the FIG. 2 embodiment is that the shorting winding and associated components are eliminated, and the regenerative feedback interruption function is performed by a transistor connected in place of diodes 12 and 13 (FIG. 1).

More specifically, a transistor 20 is of the NPN type having a collector, an emitter and a base. The dot end of feedback winding 9 is connected to ground, and the other end thereof is connected to the collector of transistor 20. The emitter of transistor 20 is connected to the base of power transistor 1, and also to one of the "turn-off" input terminals 21. The base of transistor 20 is connected to the other "turn-off" input terminal 22. The operating characteristics of transistor 20 are such that when a positive pulse is applied at terminal 22 with respect to terminal 21, the transistor becomes conductive and effectively connects the feedback winding 9 directly to the base of power transistor 1. If no potential is applied to the base of transistor 20, the transistor is nonconductive and effectively disconnects the feedback winding from the base of the power transistor 1.

In the operation of this circuit, it can initially be assumed that the transformer core is in the negative state of saturation. Next, it is necessary to apply a positive potential to the base of transistor 20, thereby rendering this transistor conductive to connect the feedback winding to the power transistor. Thereafter, when a pulse is applied to "turn-on" input terminals 5 and 6, power transistor 1 is triggered into a state of conduction thereby causing current to flow from the positive source of potential through load resistor 2, main winding 3 and the collector-emitter circuit of the power transistor. This current flow generates a potential across the feedback winding which causes current to flow from feedback winding 9 through conducting transistor 20 into the base of power transistor 1, thereby establishing regenerative feedback. The regenerative feedback drives power transistor 1 into the saturated state of conduction. Under these operating conditions, the current flow through the collector-emitter circuit of transistor 1 is limited in accordance with the current requirements of load resistor 2, and the base current supplied by the regenerative feedback is of the minimum value required to maintain the power transistor in the saturated state of conduction regardless of load impedance variations. The regenerative feedback is interrupted when the potential is removed from the base of switching transistor 20. This causes transistor 20 to become nonconductive and therefore the feedback winding is effectively disconnected from the base of transistor 1 causing the power transistor to become nonconductive. Current flow through reset winding 10 then drives the transformer core back into the negative state of saturation. As soon as the core is reset, the pulse generating cycle can be repeated in like fashion.

The presence of a positive potential at the base of transistor 20 is necessary for operation of the circuit and is provided by applying a relatively long "turn-off" pulse to terminals 21 and 22. During the presence of the "turn-off" pulse, conduction can be initiated in power transistor 1 by applying a "turn-on" pulse to terminals 5 and 6. Conduction in power transistor 1 is thereafter terminated when the "turn-off" pulse terminates. Preferably, conduction in power transistor 1 is terminated prior to the core of transformer 4 reaching positive saturation.

Figure 3:
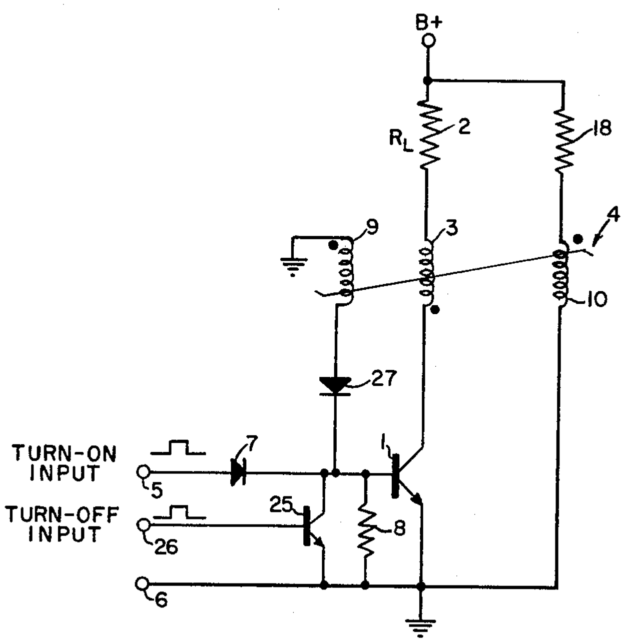

Another embodiment of the invention is illustrated schematically in FIG. 3, wherein many of the components are again similar to those previously described in FIG. 1, and therefore like reference numerals are utilized. The essential difference between the circuit illustrated in FIG. 3 and that previously illustrated in FIG. 2 is that the switching transistor 25 is connected between the base and emitter of the power transistor so as to selectively bypass the regenerative feedback current from the power transistor, as opposed to the arrangement in FIG. 2 where the switching transistor interrupts the feedback path.

More specifically, the switching transistor 25 is of the NPN type, having a collector, an emitter and a base element. The collector of transistor 25 is connected to the base of power transistor 1, and the emitter of transistor 25 is connected to the emitter of power transistor 1. The base of transistor 25 is connected to a "turn-off" input terminal 26. A properly poled diode 27 is connected between feedback winding 9 and the base of power transistor 1 to prevent "turn-on" pulses applied to input terminal 5 from passing through the feedback winding 9. When a positive "turn-off" input pulse is applied on terminal 26 with respect to terminal 6, transistor 25 becomes conductive and effectively shorts the base of transistor 1 to the emitter thereof. Accordingly, any feedback current which attempts to flow from feedback winding 9 through diode 27 will be by-passed to ground via the resistor 8 and the collector-emitter circuit of transistor 25.

In considering the operation of this circuit, it can be assumed that the transformer core is initially in the negative state of saturation and that neither transistor 1 nor transistor 25 is conducting. The pulse generating cycle is started by applying a "turn-on" input pulse, positive at terminal 5 with respect to terminal 6, to thereby trigger transistor 1 into a state of conduction. Conduction in power transistor 1 causes current to flow through load resistor 2 and main winding 3, thereby generating a voltage across feedback winding 9. The potential across the feedback winding causes feedback current to flow through diode 27 into the base of transistor 1, thereby providing regenerative feedback to increase the conduction of power transistor 1. This regenerative feedback very rapidly causes transistor 1 to reach a saturated state of conduction which is maintained by the minimum base current required, as previously described with regard to FIG. 1.

A short time interval later, when it is desired to terminate conduction in power transistor 1, a "turn-off" input pulse, positive at terminal 26 with respect to terminal 6, is applied to render transistor 25 conductive. Conduction of transistor 25 by-passes feedback current through the collector-emitter thereof and thus, the conduction in power transistor 1 is terminated. Current flow through reset winding 10 then drives the transformer core back into the negative state of saturation in preparation of the next pulse generating cycle. Additional pulses can be applied to load resistor 2 thereafter in like fashion by alternately energizing the "turn-on" and "turn-off" inputs. Preferably, the "turn-off" input is energized prior to the core of transformer 4 reaching positive saturation.

It should be noted that there is a distinct advantage in the circuit arrangement illustrated in FIG. 1 as compared to those illustrated in FIGS. 2 and 3, when low gain power transistors are utilized, i.e., power transistor having low beta ratings. If transistor 1 is of the low gain variety, there are substantial currents in the transistor base circuit. Accordingly, transistors 20 and 25 in FIGS. 2 and 3, respectively, must have a current carrying capacity sufficient to handle the currents in the transistor base circuit. However, transistor 14 in FIG. 1 can have substantially lower current carrying capacity because of the transformer coupling which substantially reduces the currents in the collector-emitter circuit of transistor 14. The circuits illustrated in FIGS. 2 and 3, however, are particularly useful where the power transistor has a higher gain, or where the current requirements of the load impedance are of a moderate value.

Figure 4:
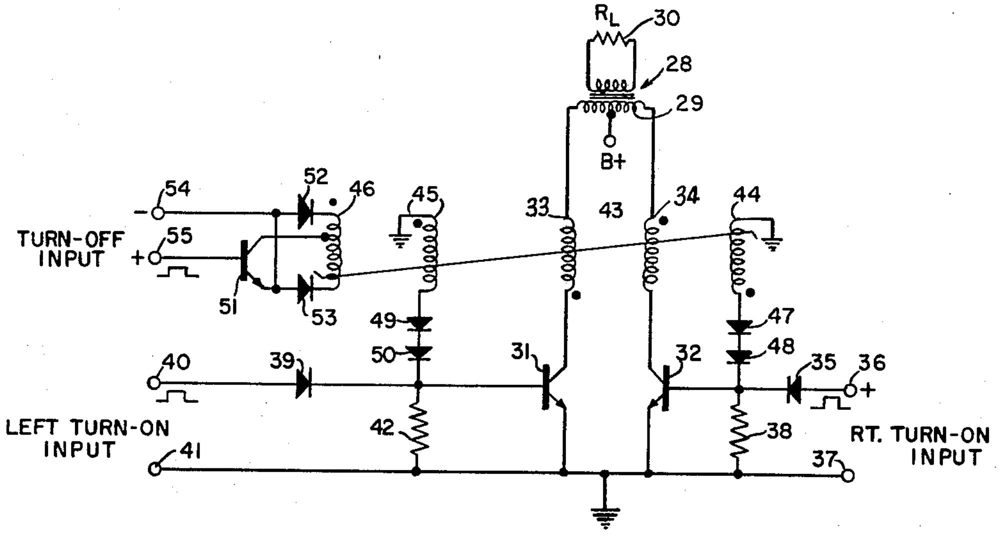

The embodiment of the invention illustrated schematically in FIG. 4 is similar to that previously described in FIG. 1, except that this circuit is adapted to operate in push-pull fashion.

Transistors 31 and 32 are power transistors of the NPN type, each having emitter, collector and base elements. The emitters of these transistors are connected to ground. The collectors thereof are connected to opposite ends of a center-tapped primary winding 29 of a transformer 28 via, respectively, a first main winding 33 and a second main winding 34 of a transformer 43. The center-tap of primary winding 29 is connected to a positive source of potential B+. A load resistor 30 is connected across the secondary winding of transformer 28.

The trigger circuit for transistor 32 includes a diode 35 connected between a "turn-on" input terminal 36 and the base of transistor 32. The emitter of transistor 32 is connected to an input terminal 37. Diode 35 is poled in a direction to permit positive pulses applied to terminal 36 to pass through the diode to the base of transistor 32. A resistor 38 is connected between the base and emitter of transistor 32 to provide sufficient bias to prevent thermal "runaway" of the transistor. When a "right turn-on" pulse, positive at terminal 36 with respect to terminal 37, is applied, the base of transistor 32 becomes positive with respect to the emitter thereof and therefore conduction is initiated in transistor 32.

A similar trigger circuit for transistor 31 includes a diode 39 connected between an input terminal 40 and the base of transistor 31. The other input terminal 41 is connected to the emitter of transistor 31. A resistor 42 is connected between the base and emitter of transistor 31 to provide sufficient bias to prevent thermal "runaway" of transistor 31. Thus, when a positive "left turn-on" pulse is applied at terminal 40 with respect to terminal 41, the base of transistor 31 becomes positive with respect to the emitter and transistor 31 therefore becomes conductive.

In addition to the first main winding 33 and the second main winding 34, transformer 43 also includes a first feedback winding 45, a second feedback winding 44 and a shorting winding 46. These windings are wound on a common transformer core having a phase relationship as indicated by the dot convention in FIG. 4. More specifically, the main windings are so wound on the common core that they induce fluxes therein in opposite directions, when their respective transistors are conductive. For convenience, it is assumed that, when transistor 31 is conductive, causing current to pass through first main winding 33, the core is driven toward positive saturation and when transistor 32 is conductive, the core is driven toward negative saturation. The first feedback winding 45 is wound on the core so that a positive potential is generated, with respect to ground, when conduction in transistor 31 causes current to pass through the first main winding 33, and similarly, the second feedback winding 44 is connected to generate a positive potential with respect to ground when conduction of transistor 32 causes current to pass through the second main winding 34. The shorting winding has a phase relationship such that a positive potential is generated at the dot end thereof when transistor 31 is conductive and such that a potential of the opposite polarity appears thereat when transistor 32 is conductive.

The dot end of feedback winding 45 is connected to ground, the other end being connected to the base of transistor 31 via a pair of series connected diodes 49 and 50. The dot end of feedback winding 44 is connected to the base of transistor 32 via a pair of series connected diodes 47 and 48, the other end of winding 44 being connected to ground. Diodes 47–50 perform a function in their respective feedback circuits similar to that performed by diodes 12 and 13, previously described in FIG. 1.

Shorting winding 46 is provided with an intermediate tap which is connected to the collector of an NPN type switching transistor 51. The emitter of transistor 51 is connected to the anode of diodes 52 and 53, the cathodes of these diodes being connected, respectively, to opposite ends of shorting winding 46. The base of transistor 51 is connected to "turn-off" input terminal 55 and the emitter thereof is connected to "turn-off" input terminal 54.

In describing the operation of this circuit, it can be assumed that the core of transformer 43 is initially at the negative state of saturation and that none of the transistors are conductive. When a positive "left turn-on" pulse is applied at terminal 40 with regard to terminal 41, this pulse passes through diode 39 and triggers transistor 31 into the partially conductive state. Conduction of transistor 31 causes current to flow from the positive source of potential through a portion of primary winding 29, first main winding 33 and the collector-emitter circuit of transistor 31, thereby providing an energy pulse across the secondary winding of transformer 28 to energize load resistor 30. This current flow drives the core of transformer 43 toward positive saturation. The "left turn-on" pulse applied to input terminals 40 and 41 must be of a sufficient magnitude to render transistor 31 sufficiently conductive so that the potential generated across feedback winding 45 is sufficient to overcome the combined forward conducting threshold voltages of diodes 49, 50 and the base-emitter diode of transistor 31. Thus, when transistor 31 becomes partially conductive, current begins to flow from the feedback winding through diodes 49 and 50 into the base of transistor 31, thus establishing regenerative feedback. This regenerative feedback drives transistor 31 into a state of saturation. The turns ratio between winding 33 and feedback winding 45 is carefully selected such that the feedback current provided is of the minimum value sufficient to maintain transistor 31 in the saturated state of conduction. The phase relationship between the second feedback winding 44 and the first main winding 33 is such that the potential generated across feedback winding 44 is blocked by diodes 47 and 48 and therefore transistor 32 is not affected.

Conduction in transistor 31 is thereafter terminated by applying a positive "turn-off" pulse at input terminal 55 with respect to input terminal 54. Current flow through main winding 33 generates a potential across shorting winding 46 which is negative at the dot end of the shorting winding. The "turn-off" pulse applied to input terminals 54 and 55 renders transistor 51 conductive, and due to the potential across the shorting winding 46, transistor 51 completes a current conducting path from the center-tap of the shorting winding through the collector-emitter circuit thereof and through diode 52. Thus, transistor 51 in effect short-circuits a portion of shorting winding 46 to thereby substantially reduce the potential generated across feedback winding 45 to a value below the combined threshold voltages of diodes 49 and 50; regenerative feedback to transistor 31 is therefore terminated and conduction in transistor 31 ceases. It should be noted that the time duration of the pulse applied to load resistor 30 is determined by the time interval between the "left turn-on" pulse and the "turn-off" pulse. The core of transformer 43 is sufficiently large to prevent the core from reaching positive saturation during this time interval.

Next, a "right turn-on" pulse is applied to terminals 36 and 37 to similarly initiate conduction in transistor 32. When transistor 32 is conductive, current flows from the positive source of potential through a portion of primary winding 29, main winding 34 and the collector-emitter circuit of transistor 32. This current flow energizes load resistor 30 and generates a feedback potential across feedback winding 44. As a result, regenerative feedback current begins to flow into the base of transistor 32, driving this transistor into the fully saturated conducting state. The turns ratio between main winding 34 and feedback winding 44 is such that the feedback current applied to the base of transistor 32 is of the minimum value required to maintain this transistor in a state of saturation.

Conduction in transistor 32 is terminated by applying a "turn-off" pulse at input terminals 55 and 54. When current passes through main winding 34, the potential generated across shorting winding 46 is positive at the dot end and therefore conduction of transistor 51 completes a current-carrying path from the center-tap of the shorting winding through the collector-emitter circuit of transistor 51 and through diode 53. Thus, transistor 51 effectively short-circuits a portion of the shorting winding to in turn decrease the potential generated across feedback winding 44 to a value which is less than the forward conducting threshold voltages of diodes 47 and 48 and the base-emitter diode of transistor 32. Thus, the regenerative feedback is terminated and transistor 32 becomes nonconductive. The current flow through main winding 34 drives the transformer core toward negative saturation, and therefore the core is again in the proper state for the subsequent pulse generating cycle wherein transistor 31 is again rendered conductive. The operation continues in this manner with transistors 31 and 32 becoming alternately conductive to provide an alternating current rectangular wave signal to load resistor 30.

It should be pointed out that there is a definite sequential relationship between the "right turn-on" pulse, the "left turn-on" pulse and the "turn-off" pulses. The "right and left turn-on" pulses must appear alternately so that the core is driven alternately toward the negative and positive saturated states. Also, a "turn-off" pulse must occur between successive "turn-on" pulses within a time interval less than that required for the transformer core to actually reach saturation.

The cut-off circuit in FIG. 4 is of the type where a switching transistor selectively short-circuits the shorting winding. This type of cut-off circuit is particularly advantageous when power transistors 31 and 32 are of the low gain variety, for reasons previously pointed out. Also, this type of cut-off circuit has the advantage that either of the power transistors can be cut off by means of a single switching transistor 51. The cut-off circuit arrangements shown in FIGS. 2 and 3 can also be adapted in a push-pull type pulse generating circuit, as shown in FIG. 4, but in each case two switching transistors would be required.

While several advantageous embodiments of the present invention have been illustrated in detail, these embodiments by no means exhaust all the possible combinations within the scope of this invention. The scope of this invention is more particularly pointed out in the appended claims.

What is claimed is:

1. In a pulse generating circuit, the combination of
a transistor,
trigger circuit means connected to said transistor to initiate conduction therein;
a transformer having a plurality of coupled windings including;
a feedback winding interconnected with said transistor so as to provide regenerative feedback and maintain said transistor in the conductive state once conduction has been initiated;
switching means connected across a second winding of said transformer and responsive to a turn-off input pulse to effectively short-circuit said second winding to in turn reduce the regenerative feedback currents generated in the feedback winding; and means for preventing the generated currents of reduced value from reaching said transistor and thus terminating conduction in said transistor.

2. A pulse generating circuit in accordance with claim 1 wherein said switching means is a second transistor connected to effectively short-circuit said second winding when the second transistor is conductive.

3. In a pulse generating circuit, the combination of
a transformer having a main winding, a feedback winding and a shorting winding, said windings being mutually coupled via a common core;
a first transistor;
first circuit means interconnecting said first transistor and said main winding such that current flow through said main winding is in accordance with the conductive state of said first transistor;
semiconductor diode means having a predetermined forward conducting threshold voltage;
second circuit means interconnecting said feedback winding, said diode and said first transistor to provide regenerative feedback when the potential across said feedback winding exceeds the threshold voltage of said diode means;

trigger circuit means connected so as to be responsive to a turn-on input pulse applied thereto to initiate sufficient conduction in said first transistor so that regenerative feedback is established to thereafter maintain said first transistor in a conductive state; and a second transistor connected across said shorting winding and responsive to an applied turn-off input pulse such that when said second transistor is rendered conductive the potential drop across said feedback winding is reduced to a value below the threshold voltage of said diode means, thereby terminating conduction in said first transistor.

4. A push-pull pulse generating circuit comprising a transformer having first and second main windings, first and second feedback windings, and a shorting winding wound on a common core;

first and second transistors connected respectively to control current flow through said first and second main windings such that magnetic flux induced in said core by current flow through said first main winding is opposite in direction to that induced by current flow through said second main winding;

trigger circuit means connected to provide turn-on input pulses for initiating conduction in said first and second transistors alternately;

first circuit means for interconnecting said first feedback winding and said first transistor such that said first transistor is maintained in a conductive state by regenerative feedback once the conduction is initiated therein;

second circuit means for interconnecting said second feedback winding and said second transistor such that said second transistor is maintained in a conductive state once conduction is initiated therein; and switching means connected so as to be responsive to turn-off input pulses to effectively short-circuit at least a portion of said feedback shorting winding at a selected point in time between successive pulses provided by said trigger circuit to interrupt regenerative feedback through said transformer.

5. The push-pull pulse generating circuit in accordance with claim 4 further comprising a full-wave rectifier circuit and wherein said switching means is a switching transistor connected across at least a portion of said shorting winding via said rectifier circuit such that said portion of the shorting winding is effectively short-circuited when said switching transistor is conductive.

6. The push-pull pulse generating circuit in accordance with claim 4 further comprising semiconductor diode means having a predetermined forward conducting threshold voltage and connected between the respective feedback winding and transistor in each of said first and second circuit means and wherein said shorting means is operative to reduce the potential across said feedback winding to a value below said threshold voltage.

7. The push-pull pulse generating circuit in accordance with claim 4 wherein said first and second transistors are low gain power transistors and the current flow through a load device is controlled in accordance with the conductive states of said first and second transistors, and wherein the turns-ratio between said main windings and said feedback windings is so selected that the feedback current supplied to said transistors is of the minimum amount required to maintain said transistors in a saturated state regardless of the current requirements of the load device.

8. In a pulse generating circuit, the combination with a load of a first transistor having an emitter, collector and a base; a base-emitter input circuit and an emitter-collector circuit; a trigger circuit connected to the base-emitter input circuit of said first transistor for initiating conduction therein; a transformer having a main winding; a feedback winding and a shorting winding wound on a common magnetic core; circuit means for connecting said main winding in series with the emitter-collector circuit of said first transistor across said load and for connecting said feedback winding across the base-emitter input circuit of said first transistor to provide a normal amount of regenerative feedback thereto for maintaining it in the conductive state once conduction has been initiated therein; a second transistor connected to apply an effective short circuit across said shorting winding when said second transistor is made conductive and thereby reduce the feedback currents generated in said feedback winding; and means in the connection of said feedback winding to the base-emitter circuit of said first transistor operative when said shorting winding is short-circuited and said feedback current is reduced, to selectively terminate conduction in said first transistor and energization of said load.

9. In a pulse generating circuit, in combination, a load; a low gain power transistor having an emitter, collector and a base; a base-emitter input circuit, and an emitter-collector circuit; a trigger circuit connected to said input circuit of said transistor for initiating conduction therein; a transformer having a main, feedback and a shorting winding wound on a common magnetic core; circuit means for connecting said main winding in series with the emitter-collector circuit of said transistor across said load, and for connecting said feedback winding across said input circuit of said transistor to provide a selected amount of regenerative feedback thereto for maintaining it in the conductive state once conduction has been initiated therein; means for applying an effective short circuit to said shorting winding to reduce the feedback current generated in said feedback winding; and means connected in said feedback winding and operative, when said feedback current is reduced by the short circuiting of said shorting winding, to selectively terminate conduction in said transistor and energization of said load, the turns ratio between the main and feedback windings being so selected that the drive current supplied to said emitter-base input circuit is of the minimum amount required to maintain said transistor in the saturated state of conduction regardless of impedance variations in said load.

10. The invention defined in claim 9 wherein said short circuit applying means includes a second transistor connected across said shorting winding and effective, when conductive, to short circuit said winding and thereby selectively terminate conduction in said first named transistor.

11. The invention defined in claim 9 wherein said transformer further comprises a reset winding connected in series with said emitter-collector circuit and said load, and said invention further includes means for energizing said reset winding when said transistor is non-conductive to reset said transformer core to an initial saturated condition opposite to the condition thereof when said transistor is made conductive in response to a triggering signal from said trigger circuit.

12. In a pulse generating circuit, the combination with a load of a low-gain power transistor having an emitter, collector and a base; a base-emitter input circuit, and an emitter-collector circuit; a trigger circuit connected to said input circuit of said transistor for initiating conduction therein; a transformer having a main, a feedback and a shorting winding wound on a common magnetic core; circuit means for connecting said main winding in series with the emitter-collector circuit of said transistor across said load, and said feedback winding across said input circuit of said transistor to provide a selected amount of regenerative feedback thereto for maintaining it in the conductive state once conduction has been initiated therein; means for applying an effective short circuit to said shorting winding to reduce the feedback current generated in said feedback winding; and semiconductor diode means having a predetermined forward conducting threshold voltage connected between said feedback winding and said base of said transistor to normally permit regenerative feedback therein but to prevent regenerative feedback when said shorting winding is short circuited to reduce the voltage across said feedback winding to a value less than the threshold voltage of said diode means, and thereby selectively terminate conduction in said transistor and energization of said load.

References Cited by the Examiner

UNITED STATES PATENTS

| | | | |
|---|---|---|---|
| 2,964,651 | 12/1960 | Thomas | 307—88.5 |
| 3,053,995 | 9/1962 | Hallberg | 307—88.5 |
| 3,081,405 | 3/1963 | Hovey et al. | 307—88.5 |
| 3,119,047 | 1/1964 | Michalski | 331—170 X |

FOREIGN PATENTS

| | | |
|---|---|---|
| 1,132,964 | 7/1962 | Germany. |

ARTHUR GAUSS, *Primary Examiner.*